Nov. 17, 1959   E. MITTELMANN   2,912,767
RELUCTANCE LEVEL GAUGE
Filed Dec. 2, 1955
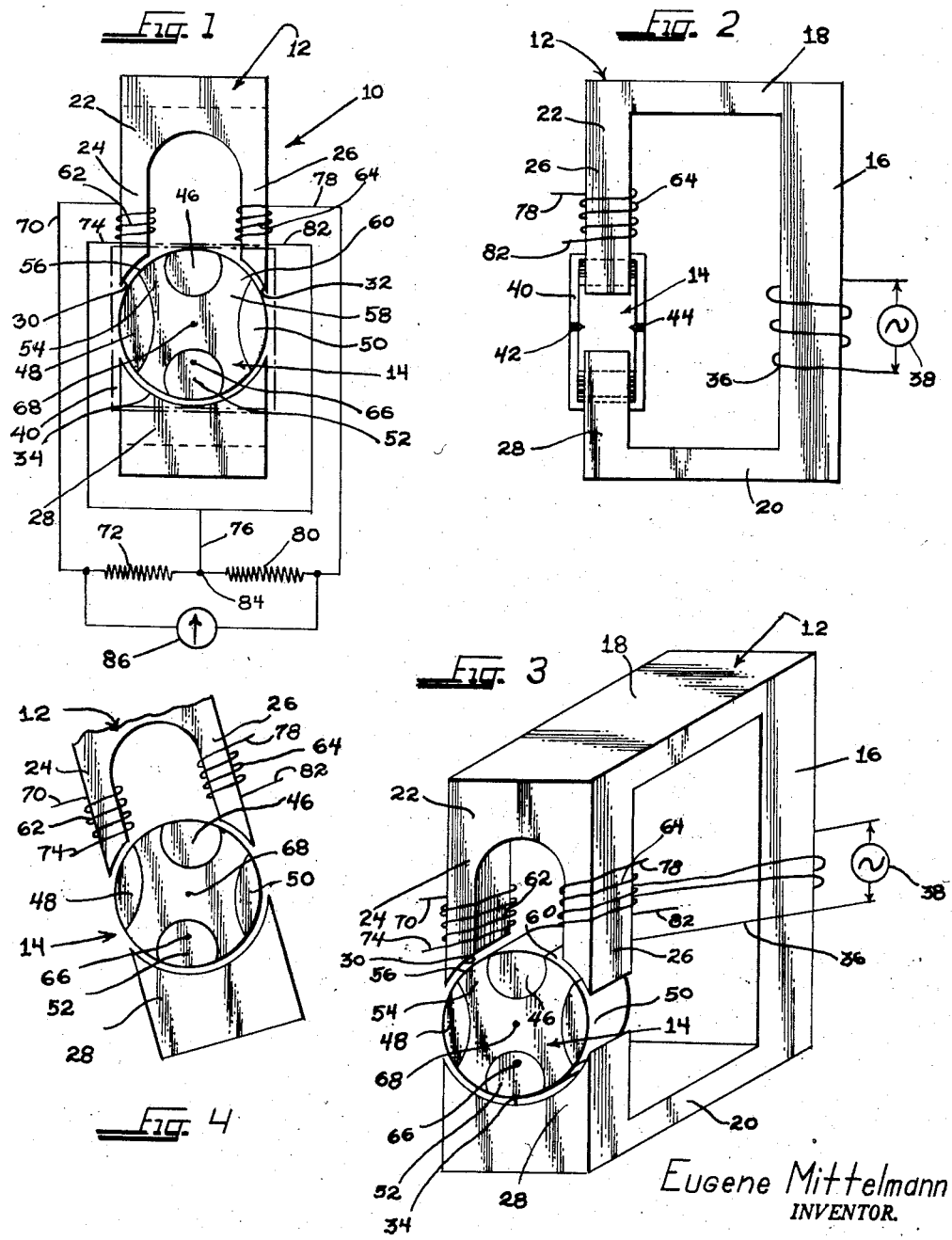
Eugene Mittelmann
INVENTOR.
BY Moore, Prangley
and Clayton
attys.

United States Patent Office 2,912,767
Patented Nov. 17, 1959

2,912,767

RELUCTANCE LEVEL GAUGE

Eugene Mittelmann, Chicago, Ill., assignor to Scanoptic, Inc., New York, N.Y., a corporation of New York Application December 2, 1955, Serial No. 550,614

2 Claims. (Cl. 33—206)

This invention relates to level gauges and particularly to reluctance level gauges.

It is an important object of this invention to provide an electrical level gauge by which deviations from the gravitationally determined vertical can be detected.

Another object of the invention is to provide a level gauge of the type set forth which utilizes changes in the reluctance of a magnetic path caused by displacement of the path with respect to a gravity responsive member forming a portion of the path.

Still another object of the invention is to provide an electrical level gauge of the type set forth which can be used to measure deviations from the gravitationally determined vertical.

A further object of the invention is to provide a level gauge of the type set forth which is simple in construction and operation and is inherently accurate in operation.

These and other objects and advantages of the invention will be better understood from the following description when taken in conjunction with the accompanying drawing. In the drawing wherein like reference numerals have been utilized to designate like parts throughout:

Figure 1 is a view of a reluctance level gauge made in accordance with and embodying the principles of the present invention, the gauge being viewed from the front and being shown schematically connected to an error signal indicating circuit;

Figure 2 is a side view of the reluctance level gauge illustrated in Figure 1;

Figure 3 is a perspective view of the reluctance level gauge of Figure 1 with the housing for the rotor removed therefrom; and Figure 4 is a schematic view similar to Figure 1 illustrating displacement of the main magnet from the gravitationally determined vertical.

Referring to Figure 1 of the drawing there is shown a reluctance level gauge generally designated by the numeral 10 made in accordance with and embodying the principles of the present invention. Gauge 10 includes in general a main magnet 12 and a gravitationally positioned rotor 14. The main magnet 12 includes a back leg 16 (see Figure 2), a top leg 18 and a lower leg 20. Depending from the forward end of top leg 18 is an upper front leg 22 which is formed as a Y-shape to provide two spaced apart leg members 24 and 26. The forward end of lower leg 20 has a lower front leg 28 extending upwardly therefrom.

The upper front leg 22 and the lower front leg 28 are in general alignment and the confronting pole faces thereof are shaped to form arcs of a circle. More specifically, leg member 24 has a face 30 which is part circular in shape and leg member 26 has a similar face 32 also formed part-circular in shape. Pole faces 30 and 32 have the same size and shape. Lower front leg 28 also has a part-circular face 34. The center of the radius and the length of the radius of part-circular faces 30, 32 and 34 are the same and equal.

The main magnet 12 is formed of a suitable magnetic material and during operation a magnetic flux flow is set up therein. To this end a plurality of exciter windings 36 is provided about back leg 16 and is powered by a generator diagrammatically indicated at 38. Exciter winding 36 may be powered at any desired alternating current frequency such as 60 cycles. The gap in the flux path between front leg members 24 and 26 and lower front leg member 28 is substantially filled by the rotor 14. Rotor 14 is substantially cylindrical in shape and is mounted within and contained by a housing 40. Housing 40 completely surrounds rotor 14 and a portion of the adjacent ends of leg members 24 and 26 and lower front leg 28. Housing 40 is formed from a non-magnetic material, preferably a clear plastic, and is shaped to receive rotor 14 in a cylindrical aperture therein. A pair of bearings 42 and 44 is provided to support rotor 14 about a horizontally disposed axis within housing 40 in a manner to permit ready rotation of rotor 14 within housing 40.

The outer diameter of rotor 14 is just slightly less than the diameter of the arc of the various pole faces 30, 32 and 34. The clearance between rotor 14 and pole faces 32 and 34 has been exaggerated in the drawings for the purpose of illustration.

The principal material of construction of rotor 14 is any suitable magnetic material. A cut-out portion 46 is formed in rotor 14 at the top thereof and a pair of part-cylindrical cut-outs 48 and 50 is formed on the sides thereof as viewed in Figure 1. Portions 46, 48 and 50 are preferably filled with some non-magnetic and relatively light weight material such as aluminum or plastic. If desired, a weight 52 of lead or some other high density material may be provided to aid in maintaining rotor 14 in a vertical position under the influence of gravity.

The magnetic material of rotor 14 between cut-out portions 46 and 48 provides a pole 54 having a part-circular pole face 56. Similarly the magnetic material between cut-out portions 46 and 50 provides a pole 58 having a pole face 60. The length of part-circular pole face 56 as viewed in Figure 1 is preferably formed equal to the length of pole face 30. Similarly the length of pole face 60 on rotor 14 is preferably formed equal to the length of pole face 32 as viewed in Figure 1. Furthermore, pole faces 56 and 60 are so positioned that normally only half of pole face 56 is positioned beneath pole face 30 and half of pole face 60 is positioned beneath pole face 32. The specific size and shape of the various cut-outs 46, 48 and 50 is such that the reluctance rises rapidly when a pole face on the rotor 14 is moved out of alignment with the associated pole face 30 or 32.

Pole leg 24 has provided thereon an electrical winding 62 which is adapted to have a signal developed therein when winding 36 is excited. Pole leg 36 has a similar winding 64 provided thereon in which is induced a signal when winding 36 is energized.

Rotor 14 is continually held in a vertical position by gravity. This results from the fact that the center of gravity, indicated by the numeral 66, is positioned below the axis of pivot 68 in a vertical position regardless of the motion of gauge 10. If magnet 12 is maintained with its longitudinal axis vertical, the magnetic flux in pole legs 24 and 26 should be equal. This results from the fact that the magnetic cross section of pole members 24 and 26 is made identical and the area of pole faces 30 and 32 is formed identical. The paths through rotor 14, that is, through the cooperating portions of the rotor faces 56 and 60, are also made equal. Accordingly, since windings 62 and 64 are identical, equal voltages should be induced in winding 62 and 64 when the exciter winding 36 is energized.

If the main magnet 12 is tilted from the vertical as is illustrated in Figure 4, then the reluctance in the flux paths through pole legs 24 and 26 will no longer be equal.

More specifically when magnet 12 is moved to the position shown in Figure 4, the reluctance in the flux path through pole leg 24 is materially increased because a substantial gap is produced across the material in cut-out 48. Simultaneously the reluctance in the flux path in pole leg 26 is materially decreased since a greater area of the rotor pole face 60 is beneath pole face 32. There results a substantial decrease in the voltage induced in winding 62 and a substantial increase in the voltage induced in winding 64. The difference in the voltages induced in winding 62 and 64 can be used as an error signal to control a servomechanism or similar control device. Alternatively, the difference in voltages can be fed to a gauge which is suitably calibrated to indicate the deviation of the main magnet 12 from the gravitationally determined vertical.

A schematic circuit for detecting the difference in voltage induced in windings 62 and 64 has been shown in Figure 1. One lead 70 of winding 62 is connected to one end of a resistor 72 and the other lead 74 is connected to a lead 76 attached to the other end of resistor 72. One lead 78 of winding 64 is connected to one end of a resistor 80 and the other lead 82 is connected to lead 76. The other ends of resistor 72 and 80 are joined as at point 84 and point 84 is connected to lead 76. A meter 86 is connected across the resistors 72 and 80.

The voltage induced in winding 62 is developed across resistor 72 and the voltage induced in winding 64 will be developed across resistor 80. The windings and the resistors are connected so that voltages induced in windings 62 and 64 are opposed to each other so that the algebraic difference appears across resistors 72 and 80. When the parts are in the position illustrated in Figure 1, the voltages developed across resistor 72 and resistor 80 will be equal and opposite whereby to produce a zero reading on meter 86. If the main magnet 12 is shifted as illustrated in Figure 4, a resultant voltage will be indicated on meter 86, the amount of the voltage indicating the degree of shift of magnet 12 from the vertical, and the coil 62 or 64 in which the greater voltage is induced indicating the direction of shift.

It is possible to use a combination of three of the level gauges 10 to indicate deviations in three planes instead of one plane. In such a circuit a level gauge 10 would be disposed in each of the three adjacent planes of a parallelopiped framework, the main magnet 12 of each gauge being disposed parallel to the adjacent plane. The combination of the three error signals would give a vector indication of the change in direction from a given predetermined direction.

It will be seen that there has been provided a reluctance level gauge which fulfills all of the objects and advantages set forth above. Although a preferred form of the invention has been shown for purposes of illustration, it is to be understood that various changes and modifications can be made therein without departing from the spirit and scope thereof. Accordingly, the invention is to be limited only as set forth in the following claims.

I claim:

1. A reluctance level gauge comprising a core member formed of magnetic material and having two aligned spaced legs, one of said legs having two spaced apart poles with arcuate angularly spaced pole faces and the other leg having a third arcuate pole face concentric with the first two pole faces and substantially greater in arcuate length than said first two pole faces, said core member having a body portion of magnetic material forming a common flux path with said legs, an exciting winding on said body portion, a pick off winding on each of said poles, a rotor in the gap between said legs, means mounting said rotor and said core member for relative angular shifting about the axis of concentricity of the three pole faces of said core member, said rotor having longitudinally extending grooves angularly spaced about the periphery of the rotor and forming a pair of pole faces on each side of a horizontal plane through the axis of said rotor, each of the pole faces on one side of said plane being of an arcuate length equal to the arcuate length of each of the first two pole faces of the core member and with the groove between them extending normally between the centers of the first two pole faces of the core member, the pair of pole faces of the rotor on the opposite side of said plane and the space between them being substantially less in arcuate length than the third pole face of the core member, relatively heavy nonmagnetic material in at least one of said grooves whereby said rotor is held in a gravitationally determined position, means connecting said pick-off winding in voltage opposed relation and means to detect a difference between said opposed voltages.

2. A reluctance level gauge comprising a core member of magnetic material, said core member having a pair of aligned spaced apart legs forming a magnetic gap therebetween and having a portion common to said legs, an exciting winding upon said common portion, one of said legs having spaced apart poles having arcuate, concentric angularly spaced pole faces, pick-off coils upon said spaced apart poles, the other leg of said core member having a single arcuate pole face concentric to said first two pole faces, a cylindrical rotor of magnetic material in said gap, means mounting said rotor and said core member for relative angular movement about an axis concentric to said three pole faces, said cylindrical rotor having spaced apart grooves in the periphery thereof extending longitudinally of the rotor, said grooves forming in the periphery of said cylindrical rotor at least three angularly spaced pole faces normally positioned opposite the three pole faces of the core member, relatively heavy non-magnetic material in one of the grooves whereby said rotor is held in a gravitationally determined vertical position, means for connecting said pick-off windings in voltage opposing relation, and means for detecting a voltage resultant from the opposed voltages.

References Cited in the file of this patent

UNITED STATES PATENTS

| | | |
|---|---|---|
| 1,897,415 | Barbour | Feb. 14, 1933 |
| 2,600,546 | Kimball et al. | June 17, 1952 |

FOREIGN PATENTS

| | | |
|---|---|---|
| 515,733 | Great Britain | Dec. 13, 1939 |